United States Patent Office  3,835,055
Patented Sept. 10, 1974

3,835,055
ELECTROLYTES FOR LOW SERIES-RESISTANCE, ALUMINUM ELECTROLYTIC CAPACITORS
Bernard Francois Gustave Chesnot, Louveciennes, France, assignor to Les Condensateurs Sic-Safco, Columbes, France
No Drawing. Continuation-in-part of application Ser. No. 139,236, Apr. 30, 1971, which is a continuation of application Ser. No. 770,433, Oct. 24, 1968, both now abandoned. This application Oct. 12, 1972, Ser. No. 296,903
Claims priority, application France, Oct. 27, 1967, 126,113
Int. Cl. H01g 9/02
U.S. Cl. 252—62.2        9 Claims

ABSTRACT OF THE DISCLOSURE

An aqueous electrolyte for aluminum-anode capacitors is comprised mainly of an acid such as maleic acid, a maleate of an aliphatic amine such as triethylamine, orthophosphoric acid, a solvent such as dimethylformamide, and optionally a small quantity of boric acid. Such an electrolyte offers high electrical conductivity and for all practical purposes a sufficiently high maximum build-up voltage, the capacitors which utilize such electrolyte being usable over a wide temperature range.

CROSS-RELATED APPLICATION

This Application is a continuation-in-part of Application Ser. No. 139,236, filed Apr. 30, 1971, which in turn is a continuation of Application Ser. No. 770,433, filed Oct. 24, 1968 and both now abandoned.

BRIEF SUMMARY OF THE INVENTION

This invention relates to a very slightly aqueous electrolyte for a capacitor which is to function satisfactorily in practical application where low temperatures, high frequencies and the possibility of high temperatures of at least 85° C. are encountered. This objective can be attained by the use of electrolytes which are highly conductive and completely stable over a temperature range of —55° C. to +125° C.

It is well known that an impregnation electrolyte must possess good anodic oxidation capacity in respect of the metal (e.g. aluminum) used for the positive metallized surface. This capacity can be characterized by two quantities:

1. The voltage build-up rate in a specimen of known area, under given current density and temperature conditions.
2. The maximum build-up voltage in the metal specimen under such conditions.

The first of these quantities is relevant to the faradic efficiency of the anodic oxidation and should therefore be high. The second quantity sets a limit on the service voltages possible with capacitors impregnated with the electrolyte in question and should therefore also be as high as possible. Unfortunately, experience shows that obtaining high electrical conductivity is not compatible with obtaining a high maximum build-up voltage.

The present invention makes it possible to produce electrolytic capacitors utilizing a very slightly aqueous electrolyte which offers high electrical conductivity and at the same time enables a maximum build-up voltage high enough for all practical purposes to be obtained.

The invention also includes in its scope such electrolytic capacitors with a very slightly aqueous electrolyte, which can be used over a wide temperature range.

In accordance with the present invention, these objectives are achieved by impregnating electrolytic capacitors having an aluminum anode with an electrolyte resulting from the combination:

1. From about $10^{-3}$ moles up to the upper solubility limit of a maleate of an aliphatic amine selected from the group consisting of

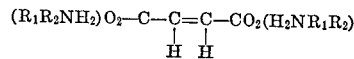

and

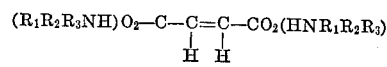

where $R_1$, $R_2$ and $R_3$ are $C_1$–$C_4$ alkyl residues;

2. From about $10^{-3}$ moles up to the upper solubility limit of maleic acid; and
3. From about $10^{-3}$ to $10^{-1}$ moles of orthophosphoric acid; these three compounds being dissolved in one mole of at least one solvent selected from the group consisting of dimethylformamide, dimethylacetamide, $\gamma$-butyrolactone, N-methylpyrrolidine.

Representative aliphatic amines in the compounds above are di- or tri-ethyl or butyl-amines, or mixed alkyl amines such as N-methylbutylamine, the preferred amine being triethylamine.

DETAILED DESCRIPTION

The following example illustrates a preferred form of the invention and its use in an electrolytic capacitor having an aluminum anode.

A mixture is made up of 13.7 moles of DMF, 0.87 mole of maleic acid, 0.13 mole of orthophosphoric acid (density 1.71) and 1 mole of triethylamine. The mixture is then heated to 120° C. in order to assist dissolving, and subsequent to cooling a solution is obtained which has an electrical conductivity of about 10 mmho/cm. at 25° C., a pH-value of 6.4 at 25° C. and a build-up capacity (measured in a beaker on smooth 99.99% aluminum at 90° C. and 5 ma./cm.$^2$) characterized by a slope of 55 v./min. and a maximum voltage of about 150 v.

Capacitors with service voltages of 4 v. and 63 v., with etched aluminum anodes were impregnated with such an electrolyte.

Even with a service voltage of 4 v., the impedance at —20° C. is less than twice the impedance at +20° C. at a frequency of 10 kilocycles per second.

Further, after 3000 hours of accelerated ageing at 95° C. at the service voltage, these capacitors exhibit a variation in capacitance of only about 5%.

In order to better clarify the object of the present invention, three sets of electrolytes were produced and compared from the electrical conductivity standpoint. The first set consisted of a variable quantity of maleic acid dissolved in DMF; the second of a variable quantity of N-methylbutylamine maleate (prepared by slowly dissolving one mole of pure maleic acid in two moles of redistilled N-methylbutylamine) in DMF; and the third consisted of a variable quantity of N-methylbutylamine maleate with $27 \times 10^{-3}$ moles of maleic acid per mole of DMF.

The results obtained are given in the three tables below:

TABLE 1
Maleic acid in DMF

| Concentration ($10^{-3}$ mole/mole) | 6.3 | 12.6 | 19 | 27 |
|---|---|---|---|---|
| Electrical conductivity, mmho/cm. at 35° C. | 0.063 | 0.082 | 0.10 | 0.12 |

TABLE 2
N-methylbutylamine maleate in DMF

| Concentration ($10^{-3}$ mole/mole) | 2.5 | 7.5 | 25 | 36 |
|---|---|---|---|---|
| Electrical conductivity, mmho/cm. at 35° C. | 1.30 | 2.75 | 5.80 | 7.05 |

TABLE 3

N-methylbutylamine maleate with $27\times10^{-3}$ mole/mole of maleic acid in DMF

| Maleate concentration ($10^{-3}$ mole/mole) | 2.5 | 7.5 | 25 | 36 |
|---|---|---|---|---|
| Electrical conductivity, mmho/cm. at 35° C | 1.90 | 4.10 | 8.90 | 10.5 |

It will be noted that the electrical conductivity of the maleic acid at $27\times10^{-3}$ mole/mole is 0.12 mmho/cm. and that that of the maleate at $36\times10^{-3}$ mole/mole is 7.05 mmho/cm., and that the combination of the acid with the salt gives 10.5 mmho/cm. whereas an electrical conductivity of about 7.2 mmho/cm. would have been anticipated. This unexpected effect constitutes one of the characteristics of the present invention and is not confined to the above example as will be demonstrated later.

A further characteristic relates to the maximum build-up voltage. This is about 85 v. (under the conditions specified above) for an electrolyte composed of $36\times10^{-3}$ mole/mole of maleate and $27\times10^{-3}$ mole/mole of maleic acid. It was then found that the addition of $13\times10^{-3}$ mole/mole of phosphoric acid (density 1.71) raised the build-up voltage to about 150 v. without affecting the electrical conductivity by more than about 10%.

There is next given in tabular form in Table 4 various compositions of electrolyte showing electrical conductivity and build-up voltage values, the first example corresponding to the above.

In Table 4, $X_1$ represents the electrical conductivity of a solution of the indicated acid at a strength of $27\times10^{-3}$ mole per mole of solvent, $X_2$ represents the electrical conductivity of a solution of the salt of the above acid and indicated aliphatic amine at a strength of $36\times10^{-3}$ mole per mole of solvent, $X_3$ represents the electrical conductivity of a solution of the salt and acid at the same strengths, $U_1$ represents the maximum build-up voltage of the solution of acid and amine, and $U_2$ represents the maximum build-up voltage of the foregoing solution to which $13\times10^{-3}$ mole of phosphoric acid per mole of solvent has been added.

pedance. Thus, at $-55°$ C., capacitors with a service voltage of 40 v. showed a change in impedance (measured with respect to the impedance at $+25°$ C.) of only 15% at 100 cycles per second and 45% at 1000 cycles per second.

Variations are obviously possible without departing from the general context of the invention. Thus, it is possible to add a small quantity of boric acid which may be regarded as a "supplier" of water at high temperature. Such variations are well known to the specialist in the art, and for this reason it was thought necessary to group together, in the following table, the characteristics of electrolytes according to this invention.

| | |
|---|---|
| Nature of electrolyte | Very slightly aqueous. |
| Useful temperature range | $-55°$ C. to $+125°$ C. |
| Maximum build-up voltage | 150 volts. |
| Build-up rate [1] | About 53 v./min. |
| Electrical conductivity | at $+30°$ C. about 10 mmho/cm. at $-30°$ C. about 2 mmho/cm. |

[1] Under the conditions specified precedingly.

An examination of the above table shows that these properties taken as a whole represent significant progress in the capacitor art.

It goes without saying that changes may be made in the compositions hereinbefore formulated without departing from the scope of the invention.

What is claimed is:

1. An electrolyte for electrolytic capacitors having aluminum anodes consisting essentially of:
   (a) maleic acid
   (b) a maleate of N-methylbutylamine, triethylamine or tributylamine, and
   (c) phosphoric acid dissolved in a solvent consisting essentially of dimethylformamide, the maleic acid and maleate respectively being present in an amount between $10^{-3}$ moles up to the upper solubility limit per mole of solvent, the phosphoric acid being present in an amount between $10^{-3}$ to $10^{-1}$ moles per mole of solvent.

TABLE 4

| Ex. No. | Base | Acid | Solvent | $X_1$ mmho/cm. | $X_2$ mmho/cm. | $X_1+X_2$ mmho/cm. | $X_3$ mmho/cm. | $X_3-(X_1+X_2)/X_1+X_2$ (percent) | $U_1$ volts | $U_2$ volts | $U_2-U_1/U_1$ (percent) |
|---|---|---|---|---|---|---|---|---|---|---|---|
| 1 | MeBuNH | Maleic | DMF | 0.12 | 7.05 | 7.17 | 10.5 | +46 | 85 | 150 | +76 |
| 2 | Et$_3$N | do | DMF | 0.20 | 11.20 | 11.40 | 11.50 | +1 | 88 | 108 | +23 |
| 3 | Bu$_3$N | do | DMF | 0.20 | 6.35 | 6.55 | 8.55 | +30 | 52 | 151 | +64 |
| 4 | Et$_3$N | do | DMAC | 0.20 | 7.50 | 7.70 | 8.07 | +5 | 106 | 174 | +64 |
| 5 | Bu$_3$N | do | DMAC | 0.20 | 4.42 | 4.62 | 6.15 | +33 | 100 | 170 | +70 |
| 6 | Et$_3$N | do | γ-butyrolactone | 0.06 | 3.85 | 3.91 | 4.93 | +26 | 110 | >300 | >+100 |
| 7 | Bu$_3$N | do | do | 0.06 | 2.15 | 2.21 | 2.76 | +25 | 112 | 155 | +38 |
| 8 | Et$_3$N | Fumaric | do | 0.03 | 0.46 | 0.49 | 0.92 | +87 | 135 | 170 | +26 |
| 9 | Et$_3$N | Maleic | N-methylpyrrolidone | 0.07 | 4.80 | 4.87 | 4.93 | +1 | 50 | 150 | >+100 |
| 10 | Bu$_3$N | do | N-methylpyrrolidone | 0.07 | 2.65 | 2.73 | 3.75 | +37 | 104 | 184 | +78 |
| 11 | Et$_3$N | do | 50 mole percent DMF, 50 mole percent γ-butyrolactone. | 0.11 | 6.60 | 6.71 | 7.62 | +13 | 95 | 140 | +47 |
| 12 | Bu$_3$N | do | 50 mole percent DMF, 50 mole percent γ-butyrolactone. | 0.11 | 3.74 | 3.85 | 4.74 | +23 | 100 | 150 | +50 |
| 13 | Et$_3$N | do | 90 mole percent DMF, 10 mole percent ethylene glycol. | 0.15 | 10.00 | 10.15 | 10.30 | +1 | 90 | 145 | +61 |
| 14 | Bu$_3$N | do | 90 mole percent DMF, 10 mole percent ethylene glycol. | 0.15 | 5.85 | 6.00 | 7.65 | +27 | 100 | 140 | +40 |

NOTE: DMF=dimethylformamide; MeBuNH=N-methylbutylamine; Bu$_3$N=tributylamine; DMAC=dimethylacetamide; Et$_3$N=triethylamine.

From Table 4 can be seen the unexpected increase in build-up voltage caused by the addition of phosphoric acid and also the production of acceptably high electrical conductivity values with the use of maleic acid with the aliphatic amines.

It was also observed that overall performance of the electrolyte was best when a small quantity of water was present, although in practice the small quantity present in most industrial products could suffice. It was established experimentally that the maximum quantity of water should be between about 0.01% and 3% by weight.

Capacitors manufactured according to the present invention can be used within a temperature range of $-55$ C. to $+125°$ C. without unduly large variations in im- 2. An electrolyte as claimed in claim 1, wherein, per mole of solvent, the maleic acid, N-methylbutylamine and phosphoric acid are present in respective concentrations of $27\times10^{-3}$ mole, $36\times10^{-3}$ mole and $13\times10^{-3}$ mole.

3. An electrolyte as claimed in claim 2, wherein said solvent consists of 90 mol percent dimethylformamide and 10 mol percent ethyleneglycol.

4. An electrolyte as claimed in claim 2, wherein said solvent consists of 50 mol percent dimethylformamide and 50 mol percent γ-butyrolactone.

5. An electrolyte as claimed in claim 2, wherein said solvent consists of 50 mol percent dimethylformamide and 50 mol percent N-methylpyrrolidine.

6. An electrolyte as claimed in claim 1 containing water in a concentration of between 0.01 and 3.0% by weight.

7. An electrolyte for electrolytic capacitors having aluminum anodes consisting essentially of maleic acid, triethylamine maleate and phosphoric acid dissolved in dimethylacetamide as a solvent, the maleic acid and triethylamine maleate being present in concentrations between $10^{-3}$ mole up to the upper limit of their solubility in said solvent, the phosphoric acid being present in a concentration between $10^{-3}$ mole to $10^{-1}$ mole, per mole of solvent.

8. An electrolyte as claimed in claim 7, wherein, per mole of dimethylacetamide, said maleic acid, said triethylamine maleate and said phosphoric acid are present in respective concentrations of $27 \times 10^{-3}$ mole, $36 \times 10^{-3}$ mole, and $13 \times 10^{-3}$ mole.

9. An electrolyte as claimed in claim 7 containing water in a concentration of beween 0.01 and 3.0% by weight.

References Cited

UNITED STATES PATENTS

| | | | |
|---|---|---|---|
| 3,293,505 | 12/1966 | Chesnot | 252—62.2 X |
| 3,138,746 | 6/1964 | Burger et al. | 252—62.2 X |
| 2,965,690 | 12/1960 | Petersen et al. | 252—62.2 X |
| 3,302,071 | 1/1967 | Stahr | 252—62.2 X |
| 3,510,731 | 5/1970 | Thiem et al. | 252—62.2 X |

JACK COOPER, Primary Examiner

U.S. Cl. X.R.

317—230